United States Patent
Ito

[11] 3,804,494
[45] Apr. 16, 1974

[54] TELEPHOTO LENS SYSTEMS HAVING SMALL TELEPHOTO RATIO

[75] Inventor: Keiichi Ito, Tokyo, Japan

[73] Assignee: Olympus Optical Company Limited, Tokyo, Japan

[22] Filed: Sept. 28, 1972

[21] Appl. No.: 292,911

[30] Foreign Application Priority Data
Oct. 1, 1971  Japan.............................. 46-76236

[52] U.S. Cl.................. 350/218, 350/177, 350/220
[51] Int. Cl............................ G02b 9/34, G02b 9/60
[58] Field of Search............................ 350/218, 220

[56] References Cited
FOREIGN PATENTS OR APPLICATIONS
11,590    7/1963    Japan.................................. 350/218

Primary Examiner—John K. Corbin
Attorney, Agent, or Firm—Eric H. Waters

[57] ABSTRACT

A telephoto lens system having a small telephoto ratio, which is constructed as front and rear groups and six lenses, in which the front group of lenses consist of a first positive meniscus lens that has its object side a convex surface, a second negative meniscus lens that has its object side a convex surface, a third positive meniscus lens that has its object side a convex surface, and a fourth negative lens, all lenses being arranged in succession in the order as mentioned from the side of an object and the second and third lenses being combined together to form a compound lens, and the rear group of lenses are largely spaced apart from the front group of lenses and consist of a fifth negative lens and a sixth positive lens, the fifth and sixth lenses being arranged in succession in the order as mentioned from the object side and combined together to form a compound lens or slightly spaced apart one from the other, and which is defined by the following four conditions, i.e.

1. $n_1 < 1.55$, $n_3 < 1.55$; $n_2 > 1.7$, $n_4 > 1.7$; $n_5 - n_6 > 0.07$,
2. $n_3 - n_2 > 0.2$,
3. $25 > \nu_5 - \nu_6 > 15$, and
4. $0.8 < |f_4/f_{1\,2\,3}| < 5.0$ where $n_1$ to $n_6$ are refractive indexes of the first to sixth lenses, respectively, $\nu_5$ and $\nu_6$ are Abbe's numbers of the fifth and sixth lenses, respectively, $f_4$ is a focal length of the fourth lens, and $f_{1\,2\,3}$ is a composite focal length of the first, second and third lenses.

3 Claims, 10 Drawing Figures

FIG_1
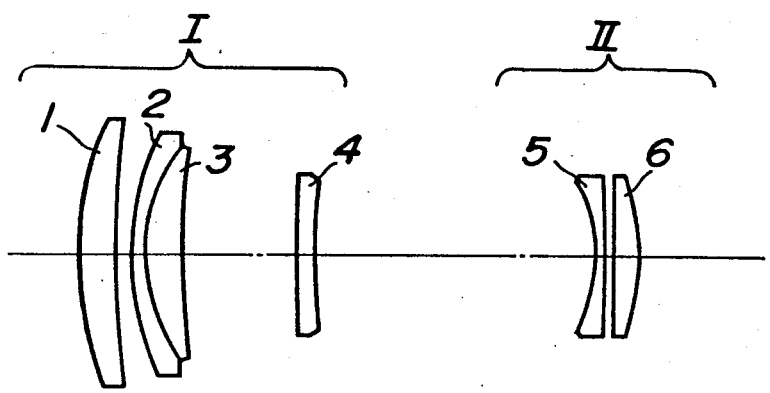
FIG_3
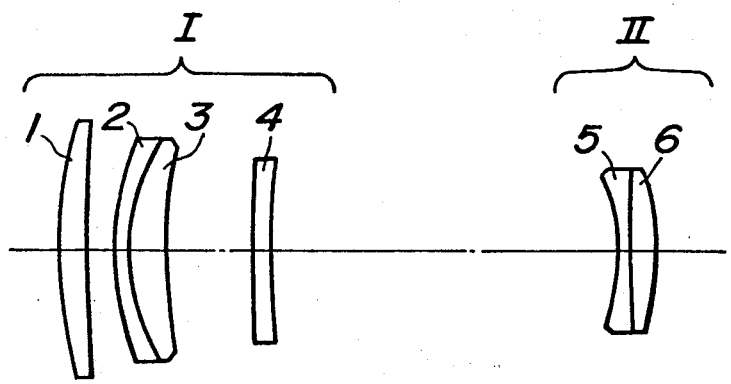

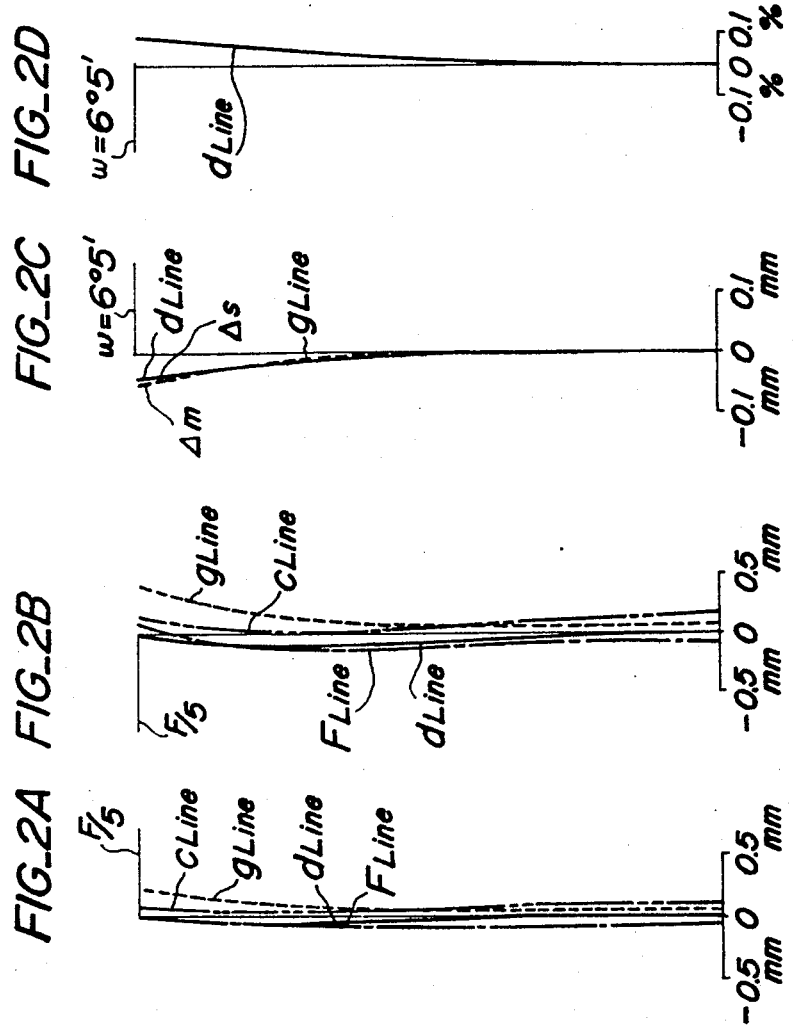

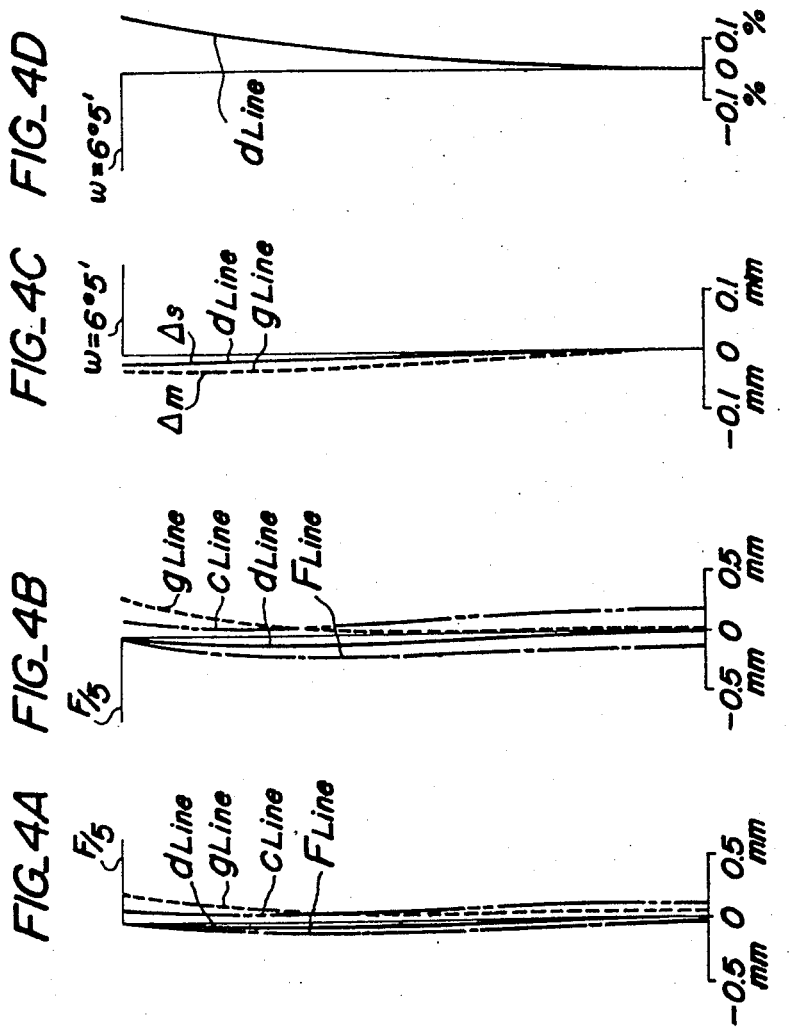

ary to increase the negative refractive power of the
TELEPHOTO LENS SYSTEMS HAVING SMALL TELEPHOTO RATIO This invention relates to telephoto lens systems having small telephoto ratio.

Conventional telephoto lens systems of this type are constructed as front and rear groups and six lenses, in which the front group of lenses consist of a first positive meniscus lens that has its object side a convex surface, a second negative meniscus lens that has its object side a convex surface, a third positive meniscus lens that has its object side a convex surface, and a fourth negative lens, all lenses being arranged in succession in the order as mentioned from the side of an object and the second and third lenses being combined together to form a compound lens, and the rear group of lenses are largely spaced apart from the front group of lenses and consist of a fifth negative lens and a sixth positive lens, the fifth and sixth lenses being arranged in succession in the order as mentioned from the object side and combined together to form a compound lens or slightly spaced apart one from the other.

Many attempts have, heretofore, been made to provide the above mentioned kind of telephoto lens system having an extremely small telephoto ratio with significantly corrected aberrations, but hitherto none has led to fully satisfactory results.

This is due to the following reasons. In general, in a lens system having a large focal length (telephoto lens system), it is desired to make the telephoto ratio smaller and hence make easy to manipulate the telephoto lens system. In order to decrease the telephoto ratio, the refractive power of the front group of lenses constituting a convex lens as a whole must be made large in its positive value and the refractive power of the rear group of lenses constituting a concave lens as a whole must be made large in its negative value. This causes the presence of a strongly inhomogeneous distribution of the refractive power of the telephoto lens system as a whole, and as a result, it becomes difficult to correct the aberrations. That is, the feature of making the telephoto ratio small and the feature of improving the correction of aberrations contradict each other. Thus, heretofore it has been the common practice to make the telephoto ratio large up to a certain extent.

The object of the invention, therefore, is to provide a telephoto lens system having an extremely small telephoto ratio, and more particularly having a telephoto ratio which is smaller than 0.8 with significantly corrected aberrations.

A feature of the invention is the provision of a telephoto lens system which is constructed as front and rear groups and six lenses, in which the front group of lenses consist of a first positive meniscus lens that has its object side a convex surface, a second negative meniscus lens that has its object side a convex surface, a third positive meniscus lens that has its object side a convex surface, and a fourth negative lens, all lenses being arranged in succession in the order as mentioned from the side of an object and the second and third lenses being combined together to form a compound lens, and the rear group of lenses are largely spaced apart from the front group of lenses and consist of a fifth negative lens and a sixth positive lens, the fifth and sixth lenses being arranged in succession in the order as mentioned from the object side and combined together to form a compound lens or slightly spaced apart one from the other, and which is defined by the following four conditions, i.e.

1. $n_1 < 1.55$, $n_3 < 1.55$; $n_2 > 1.7$, $n_4 > 1.7$; $n_5 - n_6 > 0.07$,
2. $n_2 - n_3 > 0.2$,
3. $25 > \nu_5 - \nu_6 > 15$, and
4. $0.8 < |f_4/f_{123}| < 5.0$ where $n_1$ to $n_6$ are refractive indexes of the first to sixth lenses, respectively, $\nu_5$ and $\nu_6$ are Abbe's numbers of the fifth and sixth lenses, respectively, $f_4$ is a focal length of the fourth lens, and $f_{123}$ is a composite focal length of the first, second and third lenses.

For a better understanding of the invention, the same will be explained by reference to the accompanying drawings, in which:

FIG. 1 shows in cross-section an embodiment of a telephoto lens system according to the invention;

FIGS. 2A to 2D show various aberration characteristic curves of the embodiment shown in FIG. 1;

FIG. 3 shows in cross-section another embodiment of a telephoto lens system according to the invention; and FIGS. 4A to 4D show various aberration characteristic curves of the embodiment shown in FIG. 3.

In FIG. 1 is shown an embodiment of a telephoto lens system according to the invention which is divided into front and rear groups of lenses I and II. The front group of lenses I consists of four lenses 1 to 4, that is, a first positive meniscus lens 1 that has its object side a convex surface, a second negative meniscus lens 2 that has its object side a convex surface, a third positive meniscus lens 3 that has its object side a convex surface, and a fourth negative lens 4. The second and third lenses 2 and 3 are combined together to form a compound lens which is slightly spaced apart from the first lens 1. The fourth lens 4 is also spaced apart from the compound lenses 2 and 3.

The rear group of lenses II are largely spaced apart from the front group of lenses I and consist of two lenses, that is, a fifth negative lens 5 and a sixth positive lens 6. In the present embodiment, the fifth lens 5 is slightly spaced apart from the sixth lens 6.

In FIG. 3 is shown another embodiment of the telephoto lens system according to the invention in which the front group of lenses I are arranged in the same way as in FIG. 1, but the fifth and sixth lenses 5 and 6 are combined together to form a compound lens.

In accordance with the invention the refractive indexes of the first to sixth lenses $n_1$ to $n_6$, Abbe's numbers of the fifth and sixth lenses $\nu_5$ and $\nu_6$, the focal length of the fourth lens $f_4$ and the composite focal length of the first, second and third lenses $f_{123}$ are defined by the following four conditions, i.e.

1. $n_1 < 1.55$, $n_3 < 1.55$, $n_2 > 1.7$, $n_4 > 1.7$; $n_5 - n_6 > 0.07$,
2. $n_2 - n_3 > 0.2$,
3. $25 > \nu_5 - \nu_6 > 15$, and
4. $0.8 < |f_4/f_{123}| < 5.0$.

In order to make the telephoto ratio small, it is necessary to increase the negative refractive power of the rear group of lenses II, and as a result, the Petzval sum of the rear group of lenses II becomes large in its negative value. In this case, if the condition (1), that is $n_1 < 1.55$, $n_3 < 1.55$; $n_2 > 1.7$, $n_4 > 1.7$; $n_5 - n_6 > 0.07$ is satisfied, the astigmatism can be made small. On the contrary, if the condition (1) is not satisfied, the astigmatism becomes large, thereby degrading an image of a distant object.

If the condition (2), that is, $n_2 - n_3 > 0.2$ is satisfied, the spherical aberration caused by the condition (1) can be corrected.

If the condition (3), that is, $25 > \nu_5 - \nu_6 > 15$ is satisfied, the chromatic aberration on axis becomes in balance with the chromatic aberration relating to magnification. If $\nu_5 - \nu_6 > 25$, the chromatic aberration on axis could not be corrected. If $\nu_5 - \nu_a < 15$, the chromatic aberration relating to magnification could not be corrected.

As above mentioned, in order to make the telephoto ratio small, it is necessary to make the negative refractive power of the rear group of lenses II large, and as a result, the Petzval sum of the rear group of lenses II becomes large in its negative value. In order to compensate the Petzval sum of the rear group of lenses II, which is large in its negative value, the Petzval sum of the front group of lenses must be made large in its positive value. If $|f_4/f_{123}| > 5.0$, the Petzval sum of the front group of lenses I becomes small. Thus, the above mentioned compensation of the Petzval sum could not be effected, and as a result, the astigmatism becomes large, thereby degrading the image of the distant object. If $|f_4/f_{123}| < 0.8$, the main focal point of the front group of lenses I is not positioned in front of the front group of lenses I. Thus, it is impossible to make the telephoto ratio small. As seen from the above, the condition (4), that is, $0.8 < |f_4/f_{123}| < 5.0$ must be satisfied in order to make the telephoto ratio small and also correct the astigmatism.

The invention is based on the above mentioned recognitions.

The invention will now be described with reference to the following examples.

EXAMPLE 1

In FIG. 1 is shown an embodiment of the invention, in which the front group of lenses I consist of a first lens 1, second lens 2, third lens 3 and fourth lens 4. The rear group of lenses II consist of a fifth lens 5 and sixth lens 6. The fifth lens 5 is slightly spaced apart from the sixth lens 6.

In the present embodiment, the radius of curvature of each surface of the successive lenses as counted from the left $r$, air space between the successive lenses or axial thickness of the successive lenses $d$, refractive index of the successive air spaces and lenses $nd$, and Abbe's number of the successive lenses $\nu d$ are defined as in the values given in the following Table 1.

TABLE 1

The composite focal length of the whole lens system $f=100$mm, picture angle $2\omega=12°10'$, F/5, $f_{123}=69.75$mm, $f_4=-80.48$mm, and back focus $f_B=25.5$mm.

| Lens | r(mm) | d(mm) | nd | νd |
|---|---|---|---|---|
| 1 | 27.37 | 3 | 1.4875 | 70.2 |
|   | 87.09 |   |   |   |
|   |       | 1.5 | 1 |   |
| 2 | 24.47 | 1.5 |   |   |
|   | 1.5   |     | 1.7283 | 28.5 |
|   | 15.93 |     |   |   |
| 3 |       | 3   | 1.5014 | 56.4 |
|   | 76.67 |     |   |   |
|   |       | 10  | 1 |   |
| 4 | ∞     | 1.5 | 1.744 | 44.8 |
|   | 59.87 |     |   |   |
|   |       | 25  | 1 |   |
| 5 | -12.05 | 1  | 1.713 | 54 |
|   | -83.24 |    |   |   |
|   |        | 0.5 | 1 |   |
| 6 | 355.59 | 2.5 | 1.5927 | 35.5 |
|   | -18.27 |     |   |   |
|   |        |     | 1 |   |

Various aberration characteristic curves of the present embodiment are shown in FIGS. 2A to 2D. FIG. 2A shows the spherical aberrations, FIG. 2B the sine conditions, FIG. 2C the astigmatisms, and FIG. 2D the distortion, respectively.

As seen from these aberration characteristic curves, the telephoto lens system according to the present embodiment makes it possible to significantly correct various aberrations.

The telephoto ratio is given by
$$l/f = (\Sigma d + F_B)/f = (49.5 + 25.5)/100 = 0.75$$

EXAMPLE 2

In FIG. 3 is shown another embodiment of the invention, in which the front group of lenses I consist of a first lens 1, second lens 2, third lens 3 and fourth lens 4, all of these lenses being arranged in the same way as in the Example 1. In the present embodiment, the rear group of lenses II consist of a fifth lens 5 and sixth lens 6 combined together to form a compound lens.

In the present embodiment, r, d, nd and νd are defined as in the values given in the following Table 2.

TABLE 2

$f=100$mm, $2\omega=12°10'$, F/5, $f_{123}=66.97$mm, $f_4=298.5$mm, $f_B=25$mm

| Lens | r(mm) | d(mm) | nd | νd |
|---|---|---|---|---|
|   |        |     | 1 |   |
| 1 | 38.54  | 2.5 | 1.4875 | 70.2 |
|   | 150.27 |     |   |   |
|   |        | 2.5 | 1 |   |
| 2 | 24.61  | 1.5 | 1.74 | 28.3 |
|   | 17.85  |     |   |   |
| 3 |        | 3   | 1.5163 | 64.2 |
|   | 50.55  |     |   |   |
|   |        | 7.5 | 1 |   |
| 4 | 124.83 | 1.5 | 1.7408 | 27.8 |
|   | 74.01  |     |   |   |
|   |        | 31  | 1 |   |
| 5 | -14.38 | 1   | 1.713 | 54 |
|   | 80.98  |     |   |   |
| 6 | -20.18 | 2.5 | 1.6364 | 35.4 |
|   |        |     | 1 |   |

Various aberration characteristic curves of the present embodiment are shown in FIGS. 4A to 4D. FIG. 4A shows the spherical aberrations, FIG. 4B the sine conditions, FIG. 4C the astigmatisms, and FIG. 4D the distortion, respectively.

As seen from these aberration characteristic curves, the telephoto lens system according to the present embodiment makes it also possible to significantly correct various aberrations.

The telephoto ratio of the present embodiment is 0.78 which is less than 0.8.

What is claimed is:

1. A telephoto lens system having a small telephoto ratio, which is constructed as front and rear groups and six lenses, in which the front group of lenses consists of a first positive meniscus lens that has its object side a convex surface, a second negative meniscus lens that has its object side a convex surface, a third positive meniscus lens that has its object side a convex surface, and a fourth negative lens, all lenses being arranged in succession in the order as mentioned from the side of an object and the second and third lenses being combined together to form a compound lens, and the rear group of lenses are largely spaced apart from the front group of lenses and consists of a fifth negative lens and a sixth positive lens, the fifth and sixth lenses being arranged in succession in the order as mentioned from the object side and combined together to form a compound lens arrangement, and which is defined by the following four conditions, i.e.

1. $n_1 < 1.55$, $n_3 < 1.55$; $n_2 > 1.7$, $n_4 > 1.7$; $n_5 - n_6 > 0.07$,
2. $n_2 - n_3 > 0.2$,
3. $25 > \nu_5 - \nu_6 > 15$, and
4. $0.8 < |f_4/f_{123}| < 5.0$ where $n_1$ to $n_6$ are refractive indexes of the first to sixth lenses, respectively, $\nu_5$ and $\nu_6$ are Abbe's numbers of the fifth and sixth lenses, respectively, $f_4$ is a focal length of the fourth lens, and $f_{123}$ is a composite focal length of the first, second and third lenses.

2. A telephoto lens system as claimed in claim 1, wherein the composite focal length of the whole lens system $f$ is 100mm, picture angle $2\omega$ is 12°10′, F/5, $f_{123}$ is 69.75mm, $f_4$ is −80.48mm, and back focus $f_B$ is 25.5mm and the radii of curvatures of the successive lens surfaces $r$, air spaces between the successive lenses or axial thicknesses thereof $d$, refractive indexes of the successive lenses $nd$, and Abbe's numbers of the successive lenses $\nu d$ are defined by the following values.

| Lens | r(mm) | d(mm) | nd | νd |
|---|---|---|---|---|
| 1 | 27.37 / 87.09 | 3 | 1.4875 | 70.2 |
|  |  | 1.5 | 1 |  |
| 2 | 24.47 | 1.5 | 1.7283 | 28.5 |
| 3 | 15.93 / 76.67 | 3 | 1.5014 | 56.4 |
|  |  | 10 | 1 |  |
| 4 | ∞ / 59.87 | 1.5 | 1.744 | 44.8 |
|  |  | 25 | 1 |  |
| 5 | −12.05 / −83.24 | 1 | 1.713 | 54 |
|  |  | 0.5 | 1 |  |
| 6 | 355.59 / −18.27 | 2.5 | 1.5927 | 35.5 |
|  |  |  | 1 |  |

3. A telephoto lens system as claimed in claim 1, wherein the composite focal length of the whole lens system $f$ is 100mm, picture angle $2\omega$ is 12°10′, F/5, $f_{123}$ is 66.97mm, $f_4$ is 298.5mm, and back focus $f_B$ is 25mm and the radii of curvatures of the successive lens surfaces $r$, air spaces between the successive lenses or axial thicknesses thereof $d$, refractive indexes of the successive lenses $nd$, and Abbe's numbers of the successive lenses $\nu d$ are defined by the following values.

| Lens | r(mm) | d(mm) | nd | νd |
|---|---|---|---|---|
| 1 | 38.54 / 150.27 | 2.5 | 1.4875 | 70.2 |
|  |  | 2.5 | 1 |  |
| 2 | 24.61 / 17.85 | 1.5 | 1.74 | 28.3 |
| 3 | 50.55 | 3 | 1.5163 | 64.2 |
|  |  | 7.5 | 1 |  |
| 4 | 124.83 / 74.01 | 1.5 | 1.7408 | 27.8 |
|  |  | 31 | 1 |  |
| 5 | −14.38 / 80.98 | 1 | 1.713 | 54 |
| 6 | −20.18 | 2.5 | 1.6364 | 35.4 |
|  |  |  | 1 |  |

* * * * *